United States Patent
Doraiswamy et al.

(10) Patent No.: US 9,418,271 B2
(45) Date of Patent: Aug. 16, 2016

(54) EMBEDDING INFORMATION IN AN IMAGE FOR FAST RETRIEVAL

(71) Applicant: Minkasu, Inc., Fremont, CA (US)

(72) Inventors: Naveen Doraiswamy, Fremont, CA (US); Subramanian Lakshmanan, San Jose, CA (US); Anbarasan P. Gounder, Fremont, CA (US)

(73) Assignee: Minkasu, Inc., Fremont, CA (US)

( * ) Notice: Subject to any disclaimer, the term of this patent is extended or adjusted under 35 U.S.C. 154(b) by 0 days.

(21) Appl. No.: 14/699,844

(22) Filed: Apr. 29, 2015

(65) Prior Publication Data

US 2015/0310245 A1    Oct. 29, 2015

Related U.S. Application Data

(60) Provisional application No. 61/985,703, filed on Apr. 29, 2014.

(51) Int. Cl.
  *G06K 7/10* (2006.01)
  *G06K 7/14* (2006.01)
  *G06K 19/06* (2006.01)
  *G06K 9/18* (2006.01)
  *G06K 9/48* (2006.01)
  *H04N 5/225* (2006.01)

(52) U.S. Cl.
  CPC ............ *G06K 7/1421* (2013.01); *G06K 7/1443* (2013.01); *G06K 7/1447* (2013.01); *G06K 9/18* (2013.01); *G06K 9/481* (2013.01); *G06K 19/06112* (2013.01); *G06K 19/06168* (2013.01); *H04N 5/225* (2013.01)

(58) Field of Classification Search
  CPC ................. G06K 19/06112; G06K 19/06168; G06K 7/1421; G06K 7/1443; G06K 7/1447
  USPC ............................... 235/462.03, 462.01, 494
  See application file for complete search history.

(56) References Cited

U.S. PATENT DOCUMENTS

| | | | |
|---|---|---|---|
| 2003/0001016 A1* | 1/2003 | Fraier | G06F 17/30879 235/462.03 |
| 2006/0050961 A1* | 3/2006 | Thiyagarajah | G06K 9/4638 382/181 |

\* cited by examiner

*Primary Examiner* — Seung Lee
(74) *Attorney, Agent, or Firm* — Fenwick & West LLP

(57) ABSTRACT

A binary bit-string is encoded in a circular image. The circular image encodes substrings of the bit-string in sectors of the circular image and includes redundant bits, error correcting codes, and metadata pertaining to the encoding scheme. To encode the bit-strings, a circular image is generated that includes a center ring and a first ring. Outward from the first ring, additional rings represent bits in the bit-string according to the width of each ring. The exterior of the image includes an outer boundary ring. The width of the boundary rings is used to define the widths representing the value of each ring. To extract a bit-string from an image, the center of the circular image is identified and a direction is selected to evaluate the image outward, determining the boundaries of each ring. The boundaries are analyzed to determine the width of each ring and the encoded bit values.

27 Claims, 6 Drawing Sheets

EMBEDDING INFORMATION IN AN IMAGE FOR FAST RETRIEVAL

CROSS REFERENCE TO RELATED APPLICATIONS

This application claims the benefit of U.S. provisional application No. 61/985,703, filed Apr. 29, 2014, which is hereby incorporated by reference in its entirety.

BACKGROUND

This disclosure relates generally to encoding data in machine-readable images, and more particularly to improving efficiency and robustness of data encoding and retrieval via use of a circular image.

Binary bit-strings—sequences of 1s and 0s—are commonly encoded in machine-readable images for a variety of purposes. These images can be displayed online and in the physical word, and scanned by camera-equipped devices, which then extract the encoded information. One common example is the QR code, which is used in advertising, payments, and a number of other fields. Encoding binary data in a machine-readable image allows information to be transmitted rapidly in the physical world without human users having to manually copy, record, or otherwise transfer the information by hand. Information transmitted in binary form includes verification codes, card PINS, and digital content links.

Currently available techniques for encoding information in an image, including QR codes, continue to suffer from reliability and accuracy issues. QR codes in particular need to be scanned by a camera-equipped device held in a particular orientation. If the captured image is rotated relative to the expected orientation, then the image can sometimes be unreadable. In everyday situations, such as at a store counter or any other unpredictable and noisy environment, efficiency and accuracy can be improved by using a rotationally-invariant image that can be scanned at any angle. Furthermore, this encoding scheme is more tolerant of distortion and scale than other encoding schemes, and its redundancy increases the fidelity of the scanning process.

SUMMARY

The present disclosure relates (i) a method for encoding one or more binary bit-strings in a circular image resembling a bulls-eye and including two high-contrast colors, as well as (ii) a method for extracting one or more binary bit-strings from such a circular image. Certain of these images are rotationally invariant and can be scanned at any orientation. Further, a simple encoding scheme ensures high-fidelity retrieval of encoded binary information.

Images are encoded via mapping the thickness of rings in a circular image to binary values. Two discrete thickness values are defined, and a binary value is assigned to each thickness value. Additionally, two colors are defined that contrast with each other. For every bit in a binary bit-string, a ring with thickness corresponding to the value of the bit is added around a solid circle into the image. Successive rings alternate in the contrasting colors so as to provide distinction between the rings. In further embodiments, multiple bit-strings are encoded by splitting an image into multiple sectors and encoding each binary bit-string in one or more of the sectors.

To decode an image, binary bit-strings are extracted from circular images by an image processing application. The application locates the center of a circular image and then identifies each successive ring. For each ring, the application determines a thickness and from that the corresponding binary value. The resultant bit-string is composed from the extracted values. In further embodiments, this process may be repeated for multiple sectors in the image, each of which encodes a different bit-string.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Encoding a Single Bit-String

In one embodiment a method encodes a binary bit-string in a circular image. The bit-string comprises a sequence of n bits, each having a value of either 1 or 0. In one embodiment, if the bit-string has an even number of bits, another bit, such as a 0, is prepended to it to make it odd. From this sequence of n bits, a circular image, resembling a bulls-eye, may be constructed. The circular image consists of a solid circle of a first color surrounded by rings of varying thickness, alternating between the first color and a second color. In one embodiment, black and white are used to provide high contrast between adjacent rings. With the exception of a few of the rings in the image, each ring in the circular image corresponds to a single bit in the binary bit-string. Further, each ring corresponding to a data bit may be either thick or thin; the thickness of each ring indicates the value of the bit. For a given image, the thickness and thinness values are specified prior to image creation and may differ across images. Typically, the difference in thickness between a thick ring and a thin ring is designed to be great enough so as to allow for an image processing algorithm to easily distinguish between the two. For example, the thick ring may be double the width of the thin ring.

More generally, any two contrasting colors can be used to compose the circular image as described above. Black and white provide high contrast and are effective across a wide variety of physical situations, making them a common choice. However, alternative color schemes may be employed as desired.

Methods for encoding and decoding these circular images are further provided herein. These methods may be performed by a computing device, such as a computer, which may be a stationary computer, laptop, mobile device, or other system configured to generate or decode an image for a bit string.

Figure 1:
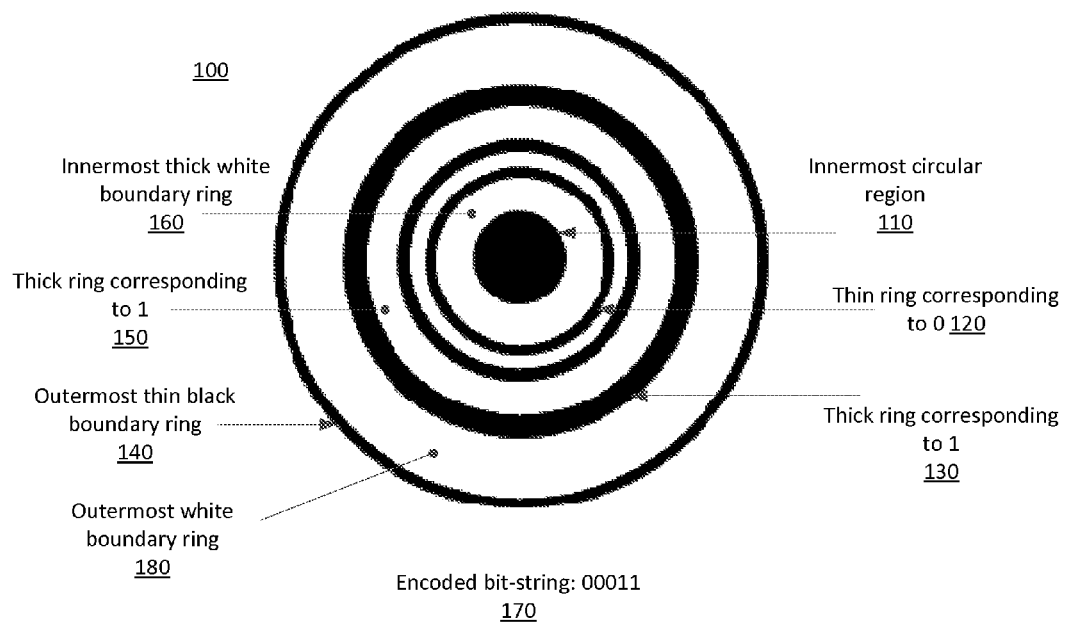
FIG. 1 is an illustration of a circular image encoded with a bit-string, according to one embodiment.

FIG. 1 features a circular image 100, into which a binary bit-string 170 is encoded according to the embodiment described above. The binary bit-string 170 has value 00011. The bulls-eye image 100 comprises an innermost circular region 110 and a series of concentric rings of varying thicknesses 120, 130, 140, 150, 160, and 180.

According to one embodiment, bits from the binary bit-string 170 are encoded into the bulls-eye image 100. The binary bit-string 170 is read from left to right, and for each bit a concentric ring is added to the outside of the bulls-eye image 100. With the exception of the innermost white boundary ring 160, the outermost white ring 180, and the outermost black boundary ring 140, each of the rings in the bulls-eye image 100 corresponds to a bit in the binary bit-string 170. In the typical embodiment described previously, each successive ring added to the bulls-eye image 100 alternates between black and white to provide a contrast between adjacent rings. The bit string is an odd number of bits in one embodiment to ensure the final ring ends with a contrasting color, such as black, distinguishable from a surface on which it is displayed. In the bulls-eye image 100, thick rings, for example rings 130 and 150, correspond to a binary value of 1. Thin rings, such as ring 120, correspond to a binary value of 0. The outermost thin black ring 140 indicates the outer boundary of the bulls-eye image 100.

In other embodiments, the relationship between thickness and numerical value can be reversed or modified. For example, a circular image may be encoded in such a way that thick rings correspond to a value of 0 and thin rings correspond to a value of 1.

Encoding Multiple Bit-strings

In another embodiment, multiple bit-strings may be encoded into a single image. This is accomplished by dividing a circular image into multiple sectors, and encoding each of the multiple bit-strings in one or more of the sectors. Bit-strings may be encoded redundantly such that the same bit-string is encoded in two or more different sectors. In a typical embodiment, if k unique bit-strings are to be encoded, then the circular image may be divided into 2k sectors, each sector spanning 360/2k degrees. Each of the k bit-strings is then encoded in two diametrically opposed sectors. The bit-strings are encoded in a consistent order such that adjacent sectors "cycle" through each of the k bit-strings. In this way, an image capture device may successfully reproduce the bit strings with any half of the circular image. For example, if two binary bit-strings are to be encoded, then an image may be divided into quadrants. In this example, one of the bit-strings is then encoded into two quadrants, and the other bit-string is encoded into the other two quadrants.

The ring pattern may be discontinuous at sector boundaries due to the fact that adjacent sectors encode different bit-strings. An image processing algorithm designed to extract the bit-strings encoded in an image may produce a spurious reading if it samples along a sector boundary. To avoid this outcome, solid sector boundaries may be added between sectors, such that all pixels lying on the boundary have the same color. Any bit-string then extracted based on sampling performed at a sector boundary would be readily identified as spurious and discarded.

Encoding Multiple Sub-Strings

In a related embodiment, a binary bit-string that is too long to be represented effectively as a single sequence may be divided into multiple component sub-strings. Each of these sub-strings may then be individually encoded into the image. In this embodiment, reconstruction of the original binary bit-string is based on the relative order of each of the component binary sub-strings to be specified. An order bit may be prepended to each of the binary sub-strings to designate the order of the substring within the string. Depending on the number of sub-strings to be encoded, more than one order bit may be used. For example, if a binary bit-string is to be divided into four separate sub-strings, then 2 order bits are prepended to each of the binary sub-strings to represent the values 0-3.

In another embodiment, binary bit-strings of different lengths may be encoded into the same image. Each bit-string may be encoded in one or more sectors according to a manner described in previous embodiments. The size of the resultant image, as well as the specification of its thick and thin values, depends on the lengths of the bit-strings, as well as the number of thick rings required to encode them. Specifically, because a bit string may include more bits with values corresponding to thick rings, then the total image corresponds to the sector describing the bit string with the most thick rings. In most situations, non-identical bit-strings encoded into one image will have different total thicknesses, such that the sectors corresponding to one bit-string may extend outward farther from the center than the sectors corresponding to another bit-string. Thus, in one embodiment, for the outermost boundary ring to remain continuous, uniform, and circular for the purpose of bit-string extraction, the ring immediately inside the boundary ring may serve as a padding ring and vary in thickness across sectors. This ring may be discontinuous and non-uniform in order to compensate for the non-uniform lengths of the sectors.

Redundancy Bits

Additional robustness may be implemented by inserting redundancy bits into one or more of the bit-strings. The redundant bits may be computed using a number of standard techniques. In one example embodiment, a CRC checksum may be implemented. During the extraction process, the redundancy bits may be checked, and if they do not match an expected pattern or value, the bit-string may be discarded.

Figure 2:
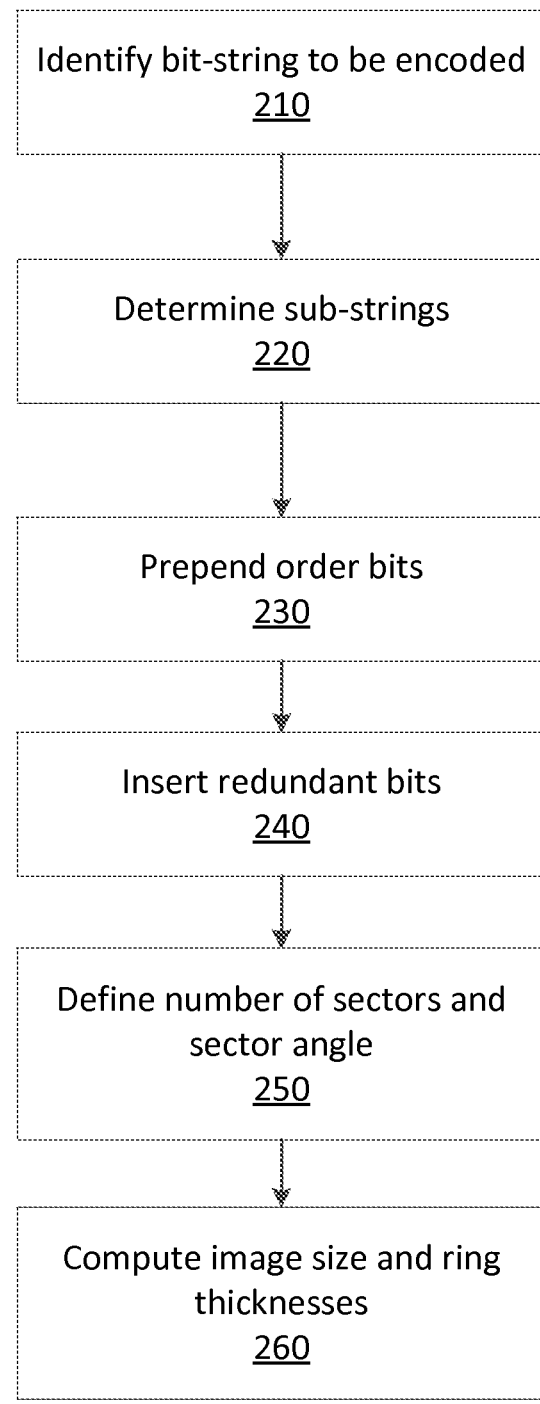
FIG. 2 is a flowchart describing a method of encoding a bit-string in an image, according to one embodiment.

FIG. 2 features a flowchart illustrating the method of encoding multiple sub-strings into an image, according to the embodiments described above. First, a computer application performing the method identifies 210 a binary bit-string to be encoded. Next, the application determines 220 whether to divide the bit string into multiple binary sub-strings based on the length of the bit string and the number of bits that may be encoded in a sector, and performs this division if necessary. For each of the binary sub-strings, the application then prepends 230 one or more order bits designating the order of the sub-strings in the bit-string. If an error-correcting code or other redundancy measure is included, the application inserts 240 redundant bits into the component sub-strings. In one alternative, these error-correcting or redundancy bits are included in the string prior to separating the string into sub-strings. Based on the number of bit-strings to be encoded, the application defines 250 the number of sectors used to encode the information. This determination includes identifying the appropriate angular width of each sector. Finally, the application computes 260 the dimensions of the image to be created based on the specifics of the binary data, including image size and ring thicknesses.

Certain steps in the embodiment of FIG. 2 are optional and are not always performed. For example, if a binary bit-string is not divided into component sub-strings, then order bits are not necessary and are not prepended. Likewise, the insertion of redundant bits or error-correcting codes depends on the particular implementation of the encoding scheme.

Figure 3:
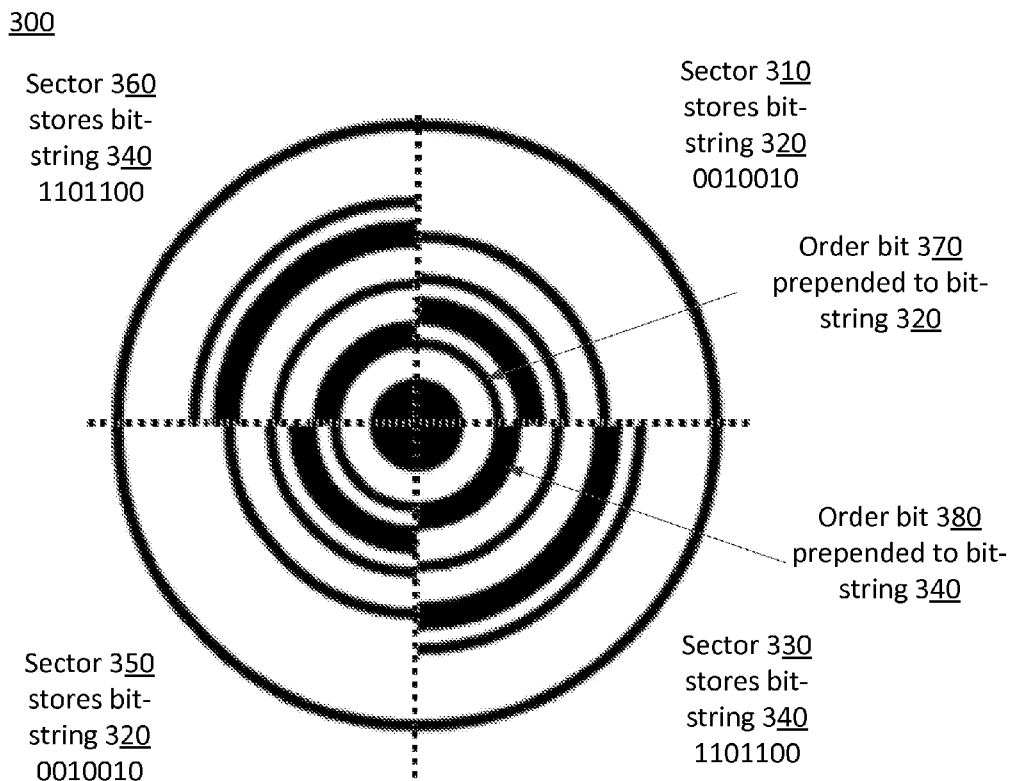
FIG. 3 is an illustration of a circular image encoded with multiple bit-strings, according to one embodiment.

FIG. 3 features a circular bulls-eye image 300 according to the previously described embodiment. The circular bulls-eye image 300 comprises four sectors 310, 330, 350, and 360, each measuring an angle 90° from one another. Sectors 310 and 350 encode a binary bit-string 320, and sectors 330 and 360 encode a binary bit-string 340. The binary bit-string 320 is prepended with an order bit 370, and the binary bit-string 340 is prepended with an order bit 380. In this example, a single order bit is used. The order bit 370 is thin, indicating a value of 0, according to the embodiment described in FIG. 1. The order bit 380 is thick, indicating a value of 1, according to the same embodiment. Thus, at time of reconstruction, a single binary bit-string may be produced, with binary substring 320 comprising the first half of the total sequence and binary sub-string 340 comprising the second half of the total sequence.

Figure 4:
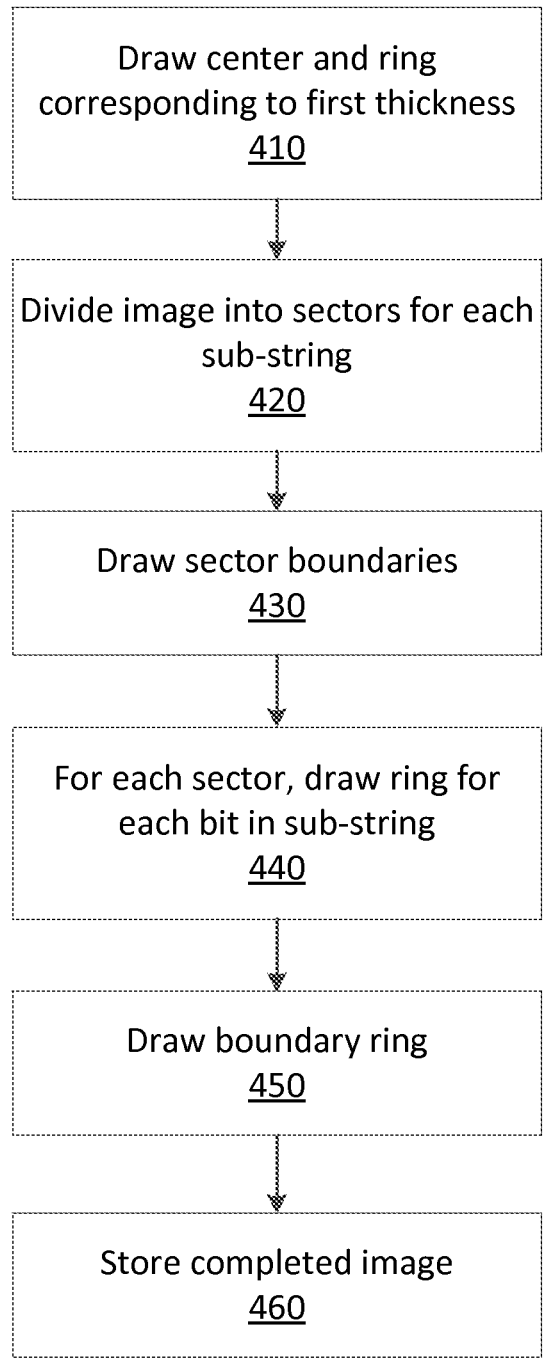
FIG. 4 is a flowchart describing a method of producing an image encoded with a bit-string, according to one embodiment.

FIG. 4 features a flowchart describing a method for producing a circular bulls-eye image, from the perspective of a computer application performing the steps. These mechanical steps may occur subsequent to the planning steps described previously in FIG. 2. Returning to FIG. 4, the computer application draws 410 a center in the first color, and around it a ring in the second color of a first thickness. Note that thickness and thinness are defined as described in FIG. 2. Then, the application divides 420 the image into sectors for each sub-string. When sector boundaries are used, the application then draws 430 sector boundaries. For each bit in a bit-string or sub-string, a ring is drawn 440. The color of the ring alternates between the first and the second color, and is drawn at the first or second thickness based on the value of the bit it represents. Next, a boundary ring is drawn 450 to signify the edge of the image. Finally, the complete image is stored 460.

It should be noted again that multiple steps in the embodiment of FIG. 4 are not always performed. The method of FIG. 4 illustrates the mechanical process by which a circular bulls-eye image is created. Some of these steps, including division 420 of the image into sectors and drawing 430 of sector boundaries, may not be performed if they are not specified or defined accordingly in the planning phase, as embodied in FIG. 3.

Metadata Encoding

Due to the numerous variations and customizations of image encoding as described in the previous embodiments, it may be useful for one or more sectors of an image to be encoded with metadata information, for example to specify which variation applies to an image. In one embodiment, this metadata information describes basic parameters necessary for proper extraction of bit-strings by an image processing application. This might include information such as the number of sectors contained in the image, the redundancy of each encoded bit-string, the number of order bits prepended to each bit-string, and so on. In most embodiments, certain image features may be omitted from a metadata sector because the specification of certain features permits an image processing system to determine the others. For example, if a metadata sector encodes the number of bit-strings encoded in the other sectors, as well as the redundancy of each bit-string, then the total number of sectors may be computed by the image processing application. Or, in another embodiment, a metadata sector may encode only the number of bit strings encoded in the other sectors, from which an image processing application can compute the necessary number of order bits. To prevent an image processing application from mistaking a metadata sector for a data sector, the metadata sector may contain a unique ring scheme. For example, the metadata sector may contain a thin innermost white boundary ring instead of a thick one, and a thick outermost black boundary ring instead of a thin one. An image processing application may identify the ring thicknesses in one sector as being different from the other sectors and thus identify it as a metadata sector. Alternatively, the image processing application may simply compare the innermost ring with the outermost boundary ring—if the innermost ring is thinner, then the image processing can identify the sector as encoding metadata. The metadata itself may consist of a series of flags, each flag indicating a particular encoding feature, or instead the metadata bits may collectively represent a key that can be used by an image processing application at the time of bit-string extraction to access a table specifying multiple encoding specifications.

Extracting a Bit-String from an Image

According to one embodiment, a bit-string or multiple component sub-strings may be extracted from a circular image by a computer application. In the example that follows, the first and second colors are black and white, though other colors may be used as described below and may vary from the process below, for example, without converting to grayscale. The computer application may photograph or otherwise capture the image in grayscale form; if the image is captured in color, the application may convert the image to grayscale. The application then classifies every pixel in the captured image as either black or white, for example using a thresholding technique. Having done so, the application then scans the image to find its center. The center of the captured image may be determined by conducting a sweep of the image and identifying the longest chord. This chord is taken to be the diameter of the circular image and its midpoint is identified as the center of the image. Additionally, the sweep may also be conducted from multiple directions, and the geometric center of each of the produced center points identified as the approximate center of the captured image.

Having identified the center of the captured image, the application then traverses a straight path extending outward from the center in a direction. On this path, the application records the value of each pixel (either black or white) and uses the information to determine the start and end of each consecutive ring. A ring may be identified as a consecutive sequence of pixels of the same color. For each ring identified, the application computes using the Cartesian distance formula the distance between the first pixel and the last pixel in the consecutive sequence of pixels of the same color. This distance defines the thickness of the ring. Having thus computed the thickness of each ring identified on the outward path, the application then uses standard clustering techniques to classify each ring as the first or second thickness. Referring back to FIG. 1, the application may use the innermost thick white boundary ring 160 and the outermost thin black boundary ring 140 as benchmark references to classify data rings as thick or thin. Based on the classification of each ring, the application then constructs a candidate bit-string.

This process is repeated for each straight path extending outward from the center of the image. In a typical embodiment, the application may traverse multiple paths, each separated by a uniform angle. For example, the application may traverse 12 paths, each path separated from another by an angle 30°. For simplicity and ease of implementation, sampling paths are generally separated by uniformly-spaced angles. In some embodiments, an image processing application may have prior knowledge of the number of sectors contained in an image. It may then use this knowledge to compute the angular width of each sector (the sector angle). Based on the sector angle, the application may define a sampling angle which defines the angle between consecutive sampling paths. The sampling angle will be selected in such a way so as to ensure that sampling at a sector boundary is minimized, which could result in spurious bit-strings. In one technique, a sampling angle is defined that is relatively prime to the sector angle; so that at the time of bit-string extraction, the number of times the sector boundary and sampling path coincide is minimized.

Figure 5:
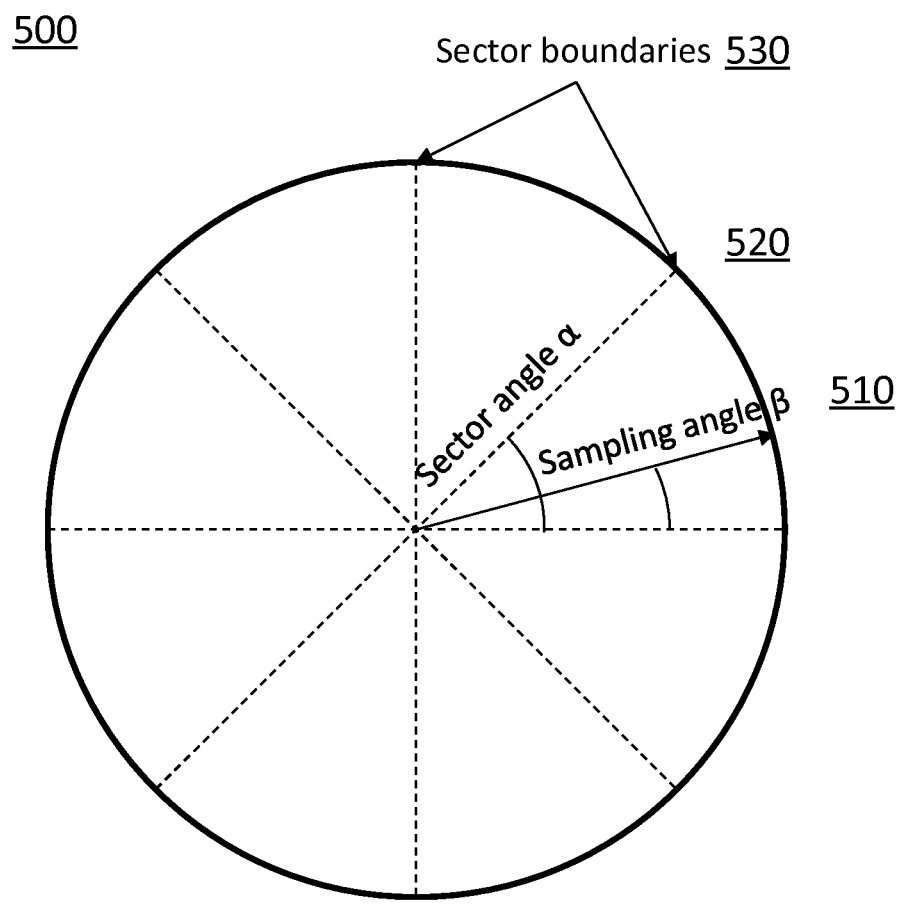
FIG. 5 is a simplified illustration of a circular image highlighting the difference between a sector angle and a sampling angle, according to one embodiment.

FIG. 5 illustrates the previously described embodiments. The environment 500 is a simplified diagram of an image, divided into 8 sectors. Sector boundaries 530 divide the sectors. Also depicted are a sector angle α 520 and a sampling angle β 510. The sampling angle β 510 is smaller than the sector angle α 520 and relatively prime to it such at the time of bit-string extraction, the number of times the sector boundary and sampling path coincide is minimized as described previously.

The candidate bit-strings produced from multiple path traversals may then be further analyzed to produce one or more output bit-strings. In some embodiments, the image processing application may have no prior knowledge of the expected number of sectors, level of redundancy, order bits, or number of bit-strings encoded in the image. In such situations, the application may acquire knowledge of image features based on the previously described method of encoding image metadata in one of the sectors of the image. In that situation, the image processing application may process the metadata, and proceed to decode the data contained in the other sectors according to the content of the metadata. The application may take multiple samples of the image, produce multiple candidate bit-strings, and compare the candidate bit-strings against one another to determine sector content or to discard spurious readings. More specifically, this may include grouping candidate bit-strings based on their prepended order bits, and for each order bit combination selecting the bit-string with the greatest frequency as the representative bit-string. Alternatively, the image processing application may specify a minimum frequency threshold which each candidate bit-string must satisfy in order to be accepted as the representative bit-string for its corresponding sector or order bit combination. All candidate bit-string not satisfying the minimum threshold may be marked as spurious and discarded. The application may also perform error checking or verification of any redundant bits or error-correcting codes.

Figure 6:
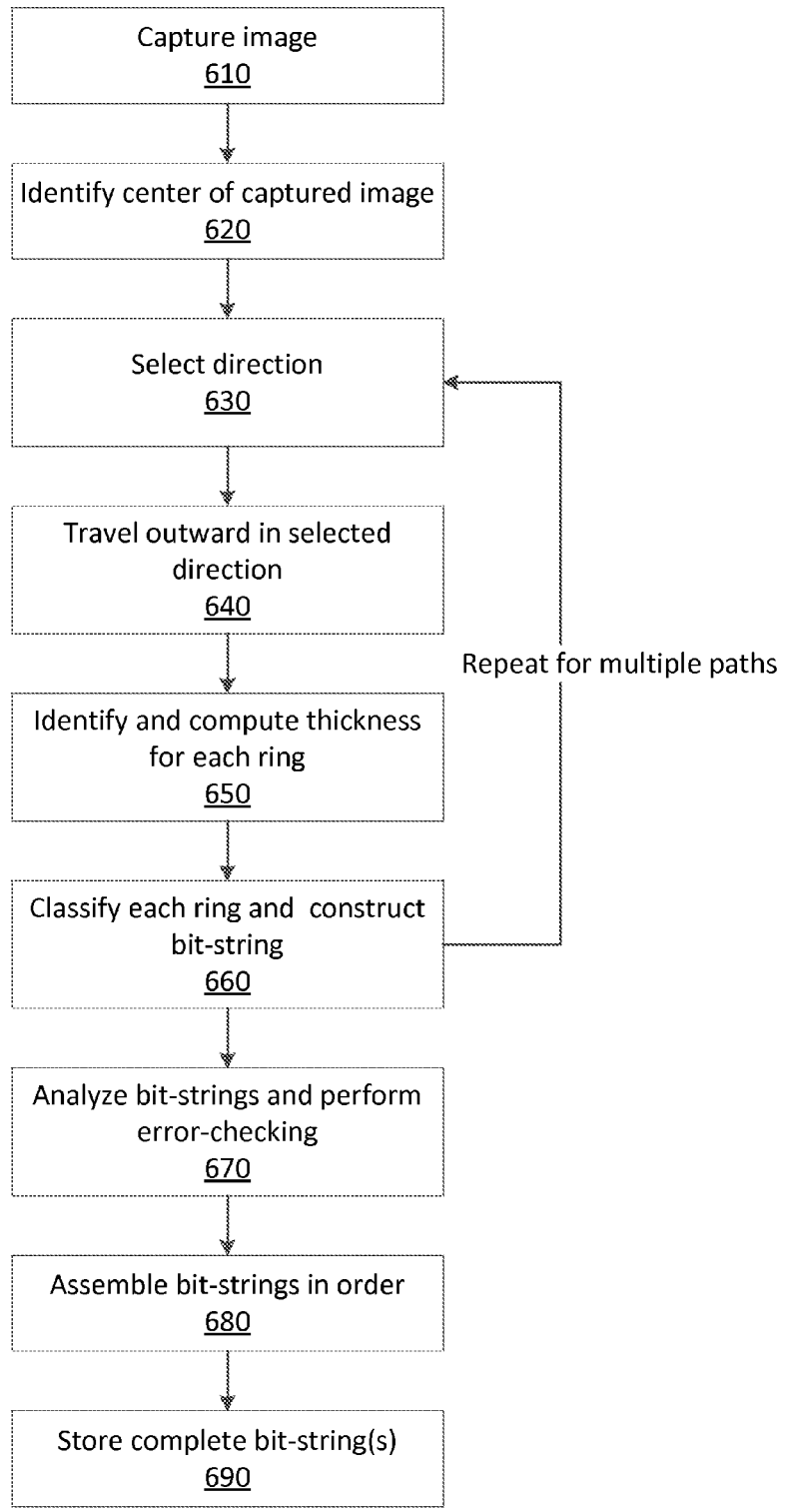
FIG. 6 is a flowchart describing a method of extracting one or more bit-strings from a circular image, according to one embodiment.

FIG. 6 is a flowchart illustrating the process of extracting one or more bit-strings from an image, as performed by an image processing application. First, the application captures 610 an image. This image may be converted to grayscale to better identify, e.g., white and black colors. The application then identifies 620 the center of the circular image in the captured image. Next, the application selects 630 a direction of travel and then travels 640 outward in that direction along a straight path. The application identifies 650 each ring based on pixel color, and for each ring computes its thickness using the Cartesian distance formula. The application then uses 660 standard clustering techniques to classify each ring as thick or thin, and a value is assigned to each ring based on its binning. The complete bit-string is constructed. The process is repeated for multiple straight-line paths, resulting in a series of candidate bit-strings. The application then analyzes 670 the candidate bit-strings and performs any desired error-checking. This may also include discarding spurious or incorrect bit patterns, such as might occur at sector boundaries. Then, if one or more bit-strings are identified as component sub-strings, the application then assembles 670 the sub-strings together based on the prepended order bits. Finally, the application stores 680 the completed bit-string.

Image Capture in Video Mode

In addition to taking photographs of an image, a camera-equipped device may capture an image while operating in video mode. In one embodiment, individual frames of a segment of video may be processed individually by an image processing application. If noise present in one image renders it unfit for successful bit-string extraction, the image processing application processes successive frames until a frame is identified in which the bits are successfully extracted.

Configuration Overview

The previously described embodiments may be implemented in a multitude of configurations, both online and in physical environments. Some typical configurations are described below.

In one embodiment, a circular image may be displayed on the checkout page of an online retailer. The image may contain, for example, a transaction ID which uniquely identifies a transaction that a consumer wishes to carry out. The image may be encoded by a software application executing on the server of the online retailer. The server defines a transaction ID and then composes the circular image. The circular image is displayed by a user's browser, and the consumer may scan the image using a smartphone. Then, an image processing application executing on the consumer's smartphone may extract from the captured image the binary bit-string encoded therein.

In another embodiment, a physical retailer may display a circular image at a point-of-sale terminal, for example on the screen of a cash register. A consumer may then scan this image using a smartphone. An image processing application executing on the consumer's smartphone may extract the binary bit-string from the captured image.

An image processing application executing on an image capture device such as a smartphone may also perform one or more transformations on the captured image prior to the extraction process. For example, an image captured by a consumer may be taken at a tilt such that the circular image instead appears elliptical. In such a situation, the image processing application transforms the image to increase circularity of the image and thus improve the accuracy of the extraction process.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the specified purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for encoding a bit-string in an image, comprising:
   defining a lesser thickness and a greater thickness;
   assigning each of the values 0 and 1 exclusively to the lesser thickness and the greater thickness;
   adding a solid circle of a first color with fixed radius to the center of a region in the image, and around the solid circle an inner boundary ring of a second color of either the greater thickness or the lesser thickness;
   for each successive bit in the bit-string:
      selecting a thickness for the bit from the lesser thickness and the greater thickness that matches the assigned value;
      adding a ring of the selected thickness to the region that alternates from a prior ring in the region between the first color and the second color;
   adding an outer boundary ring of either the greater thickness or the lesser thickness, different from the thickness of the inner boundary ring; and
   storing the completed image.

2. The method of claim 1, wherein the respective thickness of the inner boundary ring and the outer boundary ring serve as baseline comparisons against which the respective thickness of each intermediate ring is assessed to decode the image.

3. The method of claim 1, wherein the bit-string is one of a plurality of bit-strings encoded into a plurality of angular sectors, and wherein each of the plurality of bit-strings is encoded into a respective angular sector of the plurality of angular sectors.

4. The method of claim 3, wherein the plurality of angular sectors are separated by one or more sector boundaries of a single color.

5. The method of claim 3, wherein the two or more of the plurality of bit-strings encoded in the image have different lengths.

6. The method of claim 3, wherein the plurality of bit-strings are part of a combined bit-string prepended with at least one additional bit specifying the relative order of each bit-string in the combined bit-string.

7. The method of claim 3, wherein at least one of the angular sectors is encoded with metadata, the metadata including at least one of:
   a measure of redundancy of information encoded in the image;
   a measure of a number of sectors contained in the image;
   a measure of a number of substrings encoded in the image; or
   a number of order bits prepended to each of one or more substrings encoded in the image.

8. The method of claim 7, wherein an angular sector of the plurality of angular sectors in which metadata is encoded is distinguished by adjusting the inner boundary ring and the outer boundary ring to have thicknesses different in the angular sector from the respective thicknesses of the outer and inner boundary rings in other angular sectors of the plurality of angular sectors.

9. The method of claim 1, further comprising:
   computing one or more redundant bits for the bit-string; and
   inserting the one or more redundant bits into the bit-string prior to adding rings to the region associated with the bits in the bit-string.

10. A computer program product for encoding a bit-string in an image, the computer program product comprising a non-transitory computer readable storage medium containing computer program code for:
   defining a lesser thickness and a greater thickness;
   assigning each of the values 0 and 1 exclusively to the lesser thickness and the greater thickness;
   adding a solid circle of a first color with fixed radius to the center of a region in the image, and around the solid circle an inner boundary ring of a second color of either the greater thickness or the lesser thickness;
   for each successive bit in the bit-string:
      selecting a thickness for the bit from the lesser thickness and the greater thickness that matches the assigned value;
      adding a ring of the selected thickness to the region that alternates from a prior ring in the region between the first color and the second color;
   adding an outer boundary ring of either the greater thickness or the lesser thickness, different from the thickness of the inner boundary ring; and
   storing the completed image.

11. The computer program product of claim 10, wherein the respective thickness of the inner boundary ring and the outer boundary ring serve as baseline comparisons against which the respective thickness of each intermediate ring is assessed to decode the image.

12. The computer program product of claim 10, wherein the bit-string is one of a plurality of bit-strings encoded into a plurality of angular sectors, and wherein each of the plurality of bit-strings is encoded into a respective angular sector of the plurality of angular sectors.

13. The computer program product of claim 12, wherein the plurality of angular sectors are separated by one or more sector-boundaries of a single color.

14. The computer program product of claim 12, wherein the two or more of the plurality of bit-strings encoded in the image have different lengths.

15. The computer program product of claim 12, wherein the plurality of bit-strings are part of a combined bit-string prepended with at least one additional bit specifying the relative order of each bit-string in the combined bit-string.

16. The computer program product of claim 12, wherein at least one of the angular sectors is encoded with metadata, the metadata including at least one of:
- a measure of redundancy of information encoded in the image;
- a measure of a number of sectors contained in the image;
- a measure of a number of substrings encoded in the image; or
- a number of order bits prepended to each of one or more substrings encoded in the image.

17. The computer program product of claim 16, wherein an angular sector of the plurality of angular sectors in which metadata is encoded is distinguished by adjusting the inner boundary ring and the outer boundary ring to have thicknesses different in the angular sector from the respective thicknesses of the outer and inner boundary rings in other angular sectors of the plurality of angular sectors.

18. The computer program product of claim 10, further comprising:
- computing one or more redundant bits for the bit-string; and
- inserting the one or more redundant bits into the bit-string prior to adding rings to the region associated with the bits in the bit-string.

19. An encoded symbol generated by a process comprising:
- defining a lesser thickness and a greater thickness;
- assigning each of the values 0 and 1 exclusively to the lesser thickness and the greater thickness;
- adding a solid circle of a first color with fixed radius to the center of a region in an image, and around the solid circle an inner boundary ring of a second color of either the greater thickness or the lesser thickness;
- for each successive bit in the bit-string:
  - selecting a thickness for the bit from the lesser thickness and the greater thickness that matches the assigned value;
  - adding a ring of the selected thickness to the region that alternates from a prior ring in the region between the first color and the second color;
- adding an outer boundary ring of either the greater thickness or the lesser thickness, different from the thickness of the inner boundary ring; and
- generating the encoded symbol based on the completed image.

20. The encoded symbol of claim 19, wherein the respective thickness of the inner boundary ring and the outer boundary ring serve as baseline comparisons against which the respective thickness of each intermediate ring is assessed to decode the image.

21. The encoded symbol of claim 19, wherein the bit-string is one of a plurality of bit-strings encoded into a plurality of angular sectors, and wherein each of the plurality of bit-strings is encoded into a respective angular sector of the plurality of angular sectors.

22. The encoded symbol of claim 21, wherein the plurality of angular sectors are separated by one or more sector boundaries of a single color.

23. The encoded symbol of claim 21, wherein the two or more of the plurality of bit-strings encoded in the image have different lengths.

24. The encoded symbol of claim 21, wherein the plurality of bit-strings are part of a combined bit-string prepended with at least one additional bit specifying the relative order of each bit-string in the combined bit-string.

25. The encoded symbol of claim 21, wherein at least one of the angular sectors is encoded with metadata, the metadata including at least one of:
- a measure of redundancy of information encoded in the image;
- a measure of a number of sectors contained in the image;
- a measure of a number of substrings encoded in the image; or
- a number of order bits prepended to each of one or more substrings encoded in the image.

26. The encoded symbol of claim 25, wherein an angular sector of the plurality of angular sectors in which metadata is encoded is distinguished by adjusting the inner boundary ring and the outer boundary ring to have thicknesses different in the angular sector from the respective thicknesses of the outer and inner boundary rings in other angular sectors of the plurality of angular sectors.

27. The encoded symbol of claim 19, further comprising:
- computing one or more redundant bits for the bit-string; and
- inserting the one or more redundant bits into the bit-string prior to adding rings to the region associated with the bits in the bit-string.

* * * * *